United States Patent Office 3,478,038
Patented Nov. 11, 1969

3,478,038
CERTAIN 2(4-PYRIDYL-α,α-DIPHENYLCYCLO-PROPANEMETHANOLS AND INTERMEDIATES THEREFOR
Allan Poe Gray and Harold Kraus, Decatur, Ill., assignors, by mesne assignments, to Mallinckrodt Chemical Works, St. Louis, Mo., a corporation of Missouri
No Drawing. Continuation of application Ser. No. 337,729, Jan. 15, 1964. This application Sept. 6, 1968, Ser. No. 770,882
Int. Cl. C07d 31/02; A61k 27/00
U.S. Cl. 260—294.8                    3 Claims This application is a continuation application of copending application Ser. No. 337,729, filed Jan. 15, 1964, now abandoned.

This invention relates to compositions of matter classified in the art of chemistry as substituted pyridylcyclopropanes and to processes for making such compositions.

The invention sought to be patented, in its composition aspect, is described as residing in the concept of a chemical compound having a molecular structure in which there is attached, to the 4-pyridylcyclopropane nucleus through the 2-position carbon atom of the cyclopropane, the diphenylcarbinol radical by its carbinol carbon atom.

The invention sought to be patented, in its process aspect, is described as residing in the concept of reacting, at a temperature below about 50 degrees centigrade and in the presence of a basic reagent, a pictolyl chloride with ethyl acrylate to produce ethyl pyridylcyclopropanecarboxylate and then reacting the carboxylate with up to about two molar equivalents of an hydrocarbyl organometallic reagent to produce the composition of matter above-named.

The tangible embodiments of the composition aspect of the invention in the form of their free bases possess the inherent general physical properties of being solids or high boiling liquids with low aqueous solubility and greater solubility in organic solvents, for example, lower aliphatic alcohols and benzene. Examination of the compounds produced according to the herein described process reveals physical characteristics such as ultraviolet and infrared spectra which are compatible with the structure of the compositons herein set forth. The aforementioned physical characteristiccs, taken together with the nature of the analytical results, starting materials and the mode of synthesis, are in accord with the structure of the compositions sought to be patented.

The tangible embodiments of the composition aspects of the invention possess the inherent applied use characteristic of exerting a normalizing effect on the central nervous system by beneficially modifying aberrant behavior as evidenced by pharmacological and clinical evaluations and observations by trained personnel.

The manner and process of making and using the invention will now be generally described so as to enable the person skilled in the art of chemistry to make and use the same as follows:

The preparation of the intermediate ethyl pyridylcyclopropanecarboxylate is conducted at a temperature below about 50 degrees centigrade and preferably at temperatures between about zero and 30 degrees centigrade, thereby to minimize side reactions. The halogen atom of the picolyl halide starting material can be chlorine, bromine, or iodine. The reaction is also conducted in the presence of a basic reagent, such as, but without limiting the generality of the foregoing, an alkali metal as illustrated by sodium, lithium or potassium, or, an alkoxide of such metals as illustrated by sodium methoxide or lithium ethoxide, or, the hydrides of such metals as illustrated by potassium hydride and sodium hydride, or the amides of such metals as illustrated by sodium amide. The reaction is preferably conducted in a substantially anhydrous and aprotic solvent such as, but without limiting the generality of the foregoing, benzene, toluene, xylene, dimethylformamide, dimethylacetamide, ether, dioxane, or tetrahydrofuran. Alternatively, the picolyl halide can be reacted with a β-substituted ethyl propionate, in which reaction there is formed the ethyl acrylate which sequentially reacts with the picolyl halide to produce the ethyl pyridylcyclopropanecarboxylate. The conditions for the reaction with the substituted propionate are essentially the same as those to be observed for the reaction directly with ethyl acrylate except that additional basic reagent is required.

The ethyl pyridylcyclopropanecarboxylate is converted to the compositions of the invention using the conventional reaction with up to about two molar equivalents of a hydrocarbyl organometallic reagent.

The best mode contemplated by the inventors of carrying out their invention will now be set forth as follows:

All temperatures herein given are in degrees centigrade.

EXAMPLE 1

2-(4-pyridyl)-α,α-diphenylcyclopropanemethanol (A) Process of making starting intermediates.—Make basic a solution of 49.2 grams (0.3 mole) of 4-picolyl chloride hydrochloride in ice water by addition of a saturated sodium carbonate solution. Extract the oil which separates into ether and dry the ether solution over sodium sulfate and then over magnesium sulfate. Concentrate the solution under reduced pressure and dilute the residue with 25 milliliters of toluene and 60 grams (0.6 mole) of ethyl acrylate. Add this solution dropwise to a stirred mixture of 15.6 grams of a 47 percent oil dispersion of sodium hydride (0.3 mole) in 100 milliliters of dry dimethylformamide over a 15–20 minute period. Keep the reaction temperature at 20–25 degrees by cooling with an ice-bath (heat and gas are evolved from the reaction for about 3 hours). After gas evolution has stopped, add 5 milliliters of ethanol. Dilute the reaction mixture with 600 milliliters of ether and wash with a saturated sodium carbonate solution. Extract the ether layer with 5 percent hydrochloric acid and make the extract basic with saturated sodium carbonate. Extract the oil which separates into ether and dry over sodium sulfate. Concentrate the ether extract in vacuo and distill the residue to give 24.1 grams or a 42 percent yield of 4-(2-carbethoxycyclopropyl)-pyridine (cis and trans isomers) as a colorless liquid, distilling over a range of 90–97 degrees (0.15 millimeter of mercury), $n_D^{24}$ 1.5205.

Analysis.—Calculated for $C_{11}H_{13}NO_2$: N(basic), 7.33. Found: N(basic), 7.23.

(B) Preparation of composition.—Prepare a solution of phenylmagnesium bromide from 5.5 grams (0.23 mole) of magnesium and 34.5 grams (0.22 mole) of bromobenzene in 150 milliliters of ether. While the solution is being stirred and cooled in an ice-bath, add dropwise a solution of 19.1 grams (0.1 mole) of 4-(2-carbethoxycyclopropyl)-pyridine in 100 milliliters of ether. When the addition is complete, allow the reaction mixture to stand at room temperature for 15 hours and transfer the reaction mixture to a separatory funnel. Wash with a 10 percent solution of ammonium chloride and draw off the aqueous layer. Treat the organic layer with 5 percent hydrochloric acid and separate the resulting precipitate by filtration to give 17.0 grams or a 50 percent yield of 2-(4-pyridyl)-α,α - diphenylcyclopropanemethanol hydrochloride melting, after recrystallization from methanol-ether, at 232 degrees (immersed at 220 degrees).

Analysis.—Calculated for $C_{21}H_{20}ClNO$: C, 74.65; H, 5.97; Cl (ionic), 10.50. Found: 74.82; H, 6.16; Cl (ionic), 10.44.

Precipitate the free base by adding aqueous sodium hydroxide to a methanol solution of the hydrochloride salt and recrystallize from benzene-hexane to give 2-(4-pyridyl) - α,α - diphenylcyclopropanemethanol in the form of white crystals melting at 160–162 degrees.

*Analysis.*—Calculated for $C_{21}H_{19}NO$: N(basic), 4.65. Found: N(basic), 4.66.

Recrystallize mother liquor material from benzene-hexane to obtain the geometric isomer of 2-(4-pyridyl)-α,α-diphenylcyclopropanemethanol melting at 142–145 degrees. A mixture of the two isomers melts at 141–148 degrees.

*Analysis.*—Calculated for $C_{21}H_{19}NO$: N(basic), 4.65. Found: N(basic), 4.69.

Convert to the hydrochloride salt with ethereal hydrogen chloride and recrystallize from isopropyl alcohol to yield the isomer of 2-(4-pyridyl) - α,α - diphenylcyclopropanemethanol hydrochloride in the form of white crystals melting at 196 degrees (gas evolution). A mixture melting point of the hydrochloride salts of the two isomers is depressed.

*Analysis.*—Calculated for $C_{21}H_{20}ClNO$: C, 74.65; H, 5.97; Cl (ionic), 10.50. Found: 74.43; H, 6.02; Cl (ionic), 10.45.

Inspection of the infrared spectra of the two products confirms that they are different geometric isomers. The preponderance of evidence suggests that the higher melting compound, which is obtained in predominant amount, is the trans geometric isomer and the lower melting compound, which is obtained in only minor amount, is the cis isomer.

The manner of using the invention sought to be patented will now be described:

The acute toxicity of both isomers was first evaluated in mice and the intravenous and oral $LD_{50}$ values were calculated in accordance with the procedure described by Behrens and Kärber (Arch. Exp. Path. Pharmak. 177:379, 1934). The acute intravenous toxicity of the compounds was then determined in dogs with favorable results.

Sixty-day subacute toxicity studies on the predominant isomer of 2-(4 - pyridyl)-α,α-diphenylcyclopropanemethanol hydrochloride were conducted following the usual, well defined, and standarized procedures as described in the pamphlet "Appraisal of the Safety of Chemicals in Foods, Drugs and Cosmetics," published in 1959 by the Association of Food and Drug Officials of the United States (Fitzburgh, "Subacute Toxicity," p. 26). No significant toxic effects were observed in doses up to more than 10 times those of the effective dosage range of the compound.

In addition to various well-known pharmacologic procedures, the psychotropic activity of the predominant isomer of 2-(4-pyridyl)-α,α-diphenylcyclopropanemethanol hydrochloride was also evaluated in normal dogs and in dogs with established psychotic or neutrotic behavior patterns. The compound had no observable effects on the normal dogs at intravenous doses ranging from 10 to 30 mg. per kg., but did cause the dogs with either a "withdrawn" or "aggressive" behavior to revert temporarily to normal behavior after they had received intravenous doses as low as 5 mg. per kg. The compound did not antagonize the drug-induced abnormal behaviors produced by amphetamine in mice and dogs or morphine in cats, but was effective in reversing the abnormal states induced by reserpine in various animals.

No pharmacological effects of a potentially deleterious nature were observed.

The foregoing pharmacological results were confirmed clinically, a representative clinical history being as follows: a 45-year-old male with symptoms described as withdrawn, asocial and with much anxiety was given a total daily dose of 800 milligrams. At the end of 4 weeks of therapy, the patient was pleasant, less withdrawn, with decreased delusions and anxiety. Subsequently the dose was reduced to 200–400 milligrams daily and the patient retained his improvement during a six-month period of therapy.

The psychotropic activity spectrum of the minor isomer of 2-(4-pyridyl)-α,α-diphenylcyclopropanemethanol hydrochloride was also evaluated in a variety of animals. The compound produced stimulation in normal dogs or in dogs with either a "withdrawn" or "aggressive" behavior at intravenous doses ranging from 10 to 20 mg./kg. The compound did antagonize the drug-induced motor stimulation produced by amphetamine in mice but was less effective in reversing the abnormal states induced by reserpine.

The following preparations illustrate alternative manners of conducting the process described in Example 1A, using acrylic acid derivatives as the equivalents for the ethyl acrylate starting material of the example, to form starting intermediates useful in making the compositions of the invention.

In essentially the same manner as shown in Example 1A, treat 4-picolyl chloride with methyl acrylate to give 4-(2-carbomethoxycyclopropyl)-pyridine, distilling over a range of 105–115 degrees (2.5 millimeters of mercury) $n_D^{26}$ 1.5295.

*Analysis.*—Calculated for $C_{10}H_{11}NO_2$: N(basic), 7.91. Found: N(basic), 7.66.

Another modification of the starting material is illustrated by the use of acrylonitrile, as follows: In a similar manner to that shown in Example 1A, treat 4-picolyl chloride with acrylonitrile to give 4-(2-cyanocyclopropyl)-pyridine, distilling over a range of 107–115 degrees (0.3 millimeter of mercury), $n_D^{24}$ 1.5524.

*Analysis.*—Calculated for $C_9H_8N_2$: N(basic), 9.72. Found: N(basic), 9.44.

Convert to the hydrochloride salt with ethereal hydrogen chloride and recrystallize from isopropyl alcohol-ether to obtain 4-(2-cyanocyclopropyl)-pyridine hydrochloride in the form of white crystals melting at 181–184 degrees.

*Analysis.*—Calculated for $C_9H_9ClN_2$: C, 59.84; H, 5.02; Cl (ionic), 19.63. Found: 59.55; H, 5.35; Cl (ionic) 19.52.

Other starting materials equivalent in the process for preparing starting intermediates are, for example, but without limiting the generality of the foregoing, the N-di-lower-alkylacrylamides and hydrocarbyl vinyl ketones.

The foregoing starting intermediates can be substituted for the 4-(2-carbethoxycyclopropyl)-pyridine intermediate in the procedure, Part B of Example 1, to form the same composition resulting from said procedure.

The starting intermediates can also be prepared by a thermal reaction of ethyl diazoacetate with 4-vinylpyridine to give 4-(2-carbethoxycyclopropyl)-pyridine as a colorless liquid, distilling over a range of 95–105 degrees (0.3 millimeter of mercury) $n_D^{25}$ 1.5200.

*Analysis.*—Calculated for $C_{11}H_{13}NO_2$: N(basic), 7.33. Found: N(basic), 7.27.

Convert to the hydrochloride salt with ethereal hydrogen chloride and recrystallize from isopropyl alcohol-ether to obtain 4-(2-carbethoxycyclopropyl)-pyridine hydrochloride melting between 117–124 degrees (decomposition, gas evolution).

*Analysis.*—Calculated for $C_{11}H_{14}ClNO_2$; C, 58.02; H, 6.20; Cl (ionic), 15.57. Found: 58.27; H, 6.29; Cl (ionic), 15.17.

Among the modifications of the specifically described diphenylcarbinol radical attached to the 2-position of the cyclopropane portion of the pyridylcyclopropane nucleus, and which are the full equivalents of such substituent are, for purposes of illustration but without limiting the generality of the hydrocarbyl moiety, the tertiary carbinol radicals of di-aliphatic-, di-aralkyl, di-alicyclic-, and di-aryl-series, and, mixed tertiary carbinols of such hydrocarbyl substituents; the hydrocarbyl substituents, as well as the pyridyl moiety of the pyridylcyclopropane nucleus, can also bear simple substituents, illustrated by, but without limitation, lower-alkyl, lower-alkoxy, lower-alkylthio, amino, halo or trifluoromethyl, and also the points of attachment of the cylopropane ring to the pyridyl moiety can be in any of the 2, 3, or 4-positions. The compounds of the present invention will also be seen to contain at least two asymmetric carbon atoms and will ordinarily be obtained in the form of cis- and trans-racemates or mixtures thereof, which forms are the full chemical equivalents of each other. Furthermore, such equivalents exhibit similar kinds of pharmacological activity differences. For example, two isomers of the di-n-propyl derivative are obtained by the identical procedure shown for the diphenyl compound of Example IB, the hydrochloride salt of the predominant isomer (melting at 154–154.4 degrees) has no observable effect on the normal dogs while the hydrochloride of the minor isomer (melting at 173°) produces stimulation. The compositions resulting from these modifications possess the property of affecting the central nervous system.

We have also prepared, according to the foregoing procedures but using one molar equivalent of the hydrocarbyl organometallic reagent, monohydrocarbyl ketone derivatives of pyridylcyclopropane and found such compositions also have the inherent property of affecting the central nervous system. Such ketones are, therefore, the full equivalents of the di-(hydrocarbyl)-carbinols.

The monohydrocarbyl ketone derivatives of pyridylcyclopropane can be used as intermediates to prepare mono-hydrocarbylcarbinols using conventional reduction procedures. These mono-(hydrocarbyl)-carbinols are to be considered full equivalents of the di-(hydrocarbyl)-carbinols of the invention.

The free bases of the composition of matter of this invention can be used as such or in the form of their acid addition salts. The acid addition salts are the full equivalents of the free bases, and can be prepared by reacting the corresponding free base in a conventional manner with an inorganic acid as hydrochloric, hydrobromic, sulfuric and phosphoric; or an organic acid, as methanesulfonic, ethanesulfonic, ethanedisulfonic, cyclohexylsulfamic, formic, maleic, citric, tartaric, and tannic acids.

What is claimed is:

1. The process which comprises reacting picolyl chloride with ethyl acrylate to produce ethyl pyridylcyclopropane carboxylate, at a temperature of about 0–50 degrees centigrade in the presence of a basic reagent, selected from the group consisting of alkoxides, hydrides and amides of alkali metals.

2. 2-(4-pyridyl)-$\alpha,\alpha$-diphenylcyclopropanemethanol.

3. A pharmaceutically acceptable acid addition salt of the composition of claim 2.

References Cited

UNITED STATES PATENTS 3,170,928    2/1965    Burckhalter _____ 260—297

HENRY R. JILES, Primary Examiner

ALAN L. ROTMAN, Assistant Examiner

U.S. Cl. X.R.

260—294.9, 295, 297; 424—263